Sept. 10, 1929.	C. C. FARMER ET AL	1,727,398
BRAKE CYLINDER
Filed Oct. 27, 1927
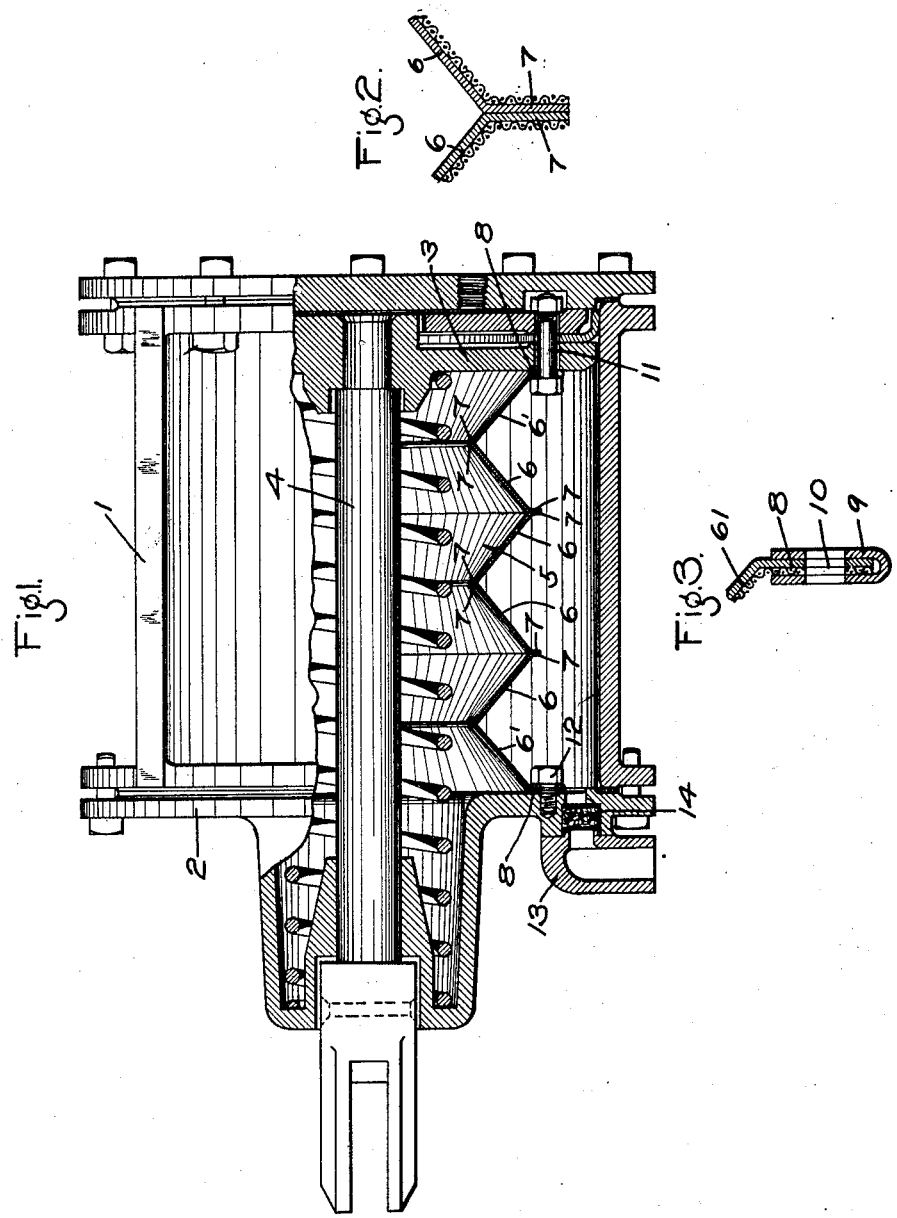
INVENTOR
CLYDE C. FARMER
AND
JOSEPH C. McCUNE
BY *Wm. M. Cady*
ATTORNEY Patented Sept. 10, 1929.                                          1,727,398

UNITED STATES PATENT OFFICE.

CLYDE C. FARMER, OF PITTSBURGH, AND JOSEPH C. McCUNE, OF EDGEWOOD, PENNSYLVANIA, ASSIGNORS TO THE WESTINGHOUSE AIR BRAKE COMPANY, OF WILMERDING, PENNSYLVANIA, A CORPORATION OF PENNSYLVANIA.

BRAKE CYLINDER.

Application filed October 27, 1927. Serial No. 228,996.

This invention relates to brake cylinders such as employed on railway cars in connection with the fluid pressure brake system.

Trouble has heretofore been experienced, due to water and dirt collecting in the chamber at the non-pressure side of the brake cylinder piston, by reason of the entrance of dirt laden air from the atmosphere into said chamber when the brake cylinder piston moves toward release position.

The principal object of our invention is to provide means for preventing the accumulation of foreign material on the walls of the brake cylinder.

In the accompanying drawing; Fig. 1 is a part sectional view of a brake cylinder showing our invention applied; Fig. 2 an enlarged section of one of the joints of the dirt excluding bag employed in Fig. 1; and Fig. 3 an enlarged section of a portion of the clamping flange of the bag.

As shown in the drawing, the brake cylinder 1 is provided with a non-pressure head 2 and contains the usual piston 3 having piston rod 4 secured thereto, said piston rod extending out of the brake cylinder through an opening in the non-pressure head.

In order to prevent foreign matter from passing to the interior walls of the brake cylinder, a flexible bag 5 is employed which is made in the form of a bellows. For this purpose, sections 6 of fabric, preferably of duck, coated with a water proof rubber composition, are made up in the form of frustums of a cone, having annular flanges 7 at each end, the flanges of adjacent sections being suitably cemented together.

The end sections 6' are provided with an extended radial flange 8, which is preferably reinforced by a rubber ring section 9 which is folded over the outer edge of the flange 8, as shown in Fig. 3. Holes 10 are provided through the flange 8 for receiving clamping bolts, such as the bolts 11 which clamp the parts of the brake cylinder piston together and bolts 12 having screw-threaded engagement in the non-pressure head 2.

Opening into the space formed between the interior walls of the brake cylinder and the bag 5 is a breather nozzle 13, preferably containing a hair strainer 14. The nozzle permits air in said space to flow out to the atmosphere when the brake cylinder piston 3 moves outwardly and the intake of air when the piston moves inwardly to the position shown in the drawing.

Any dirt or moisture which enters the brake cylinder through the opening in the non-pressure head 2 around the piston rod 4 is prevented from being deposited on the interior walls of the brake cylinder, such dirt or moisture collecting within the bag 5, as will be evident.

While one illustrative embodiment of our invention has been described in detail, it is not our intention to limit its scope to that embodiment or otherwise than by the terms of the appended claims.

Having now described our invention, what we claim as new and desire to secure by Letters Patent, is:—

1. The combination with a brake cylinder, of a flexible corrugated bellows mounted in the brake cylinder at the non-pressure side, for preventing the deposit of foreign matter on the cylinder walls.

2. The combination with a brake cylinder containing a piston and having a non-pressure head, and a piston rod connected to said piston and extending through an opening in said head, of a flexible corrugated bellows mounted in said cylinder and secured at one side to said piston and at the other end to said non-pressure head.

3. The combination with a brake cylinder containing a piston and having a non-pressure head, and a piston rod connected to said piston and extending through an opening in said head, of a flexible corrugated bellows mounted in said cylinder and secured at one side to said piston and at the other end to said non-pressure head and separating the space open to the opening in said head from the space adjacent to the interior walls of the cylinder.

4. The combination with a brake cylinder containing a piston and having a non-pressure head, and a piston rod connected to said piston and extending through an opening in said head, of a flexible corrugated bellows mounted in said cylinder and secured at one side to said piston and at the other end to said non-pressure head and separating the space open to the opening in said head from the space adjacent to the interior walls of the cylinder, an opening to the atmosphere being provided in the non-pressure head which leads to the space adjacent to the interior walls of the cylinder.

5. The combination with a brake cylinder, of a flexible bag mounted in said cylinder at the non-pressure side, said bag being formed with corrugations.

6. The combination with a brake cylinder, of a flexible bag mounted in said cylinder at the non-pressure side, said bag being formed of conical sections secured together so as to provide a corrugated bag.

In testimony whereof we have hereunto set our hands this 24th day of October, 1927.

CLYDE C. FARMER.
JOSEPH C. McCUNE.